United States Patent [19]
Coombs

[11] Patent Number: 5,633,547
[45] Date of Patent: May 27, 1997

[54] MAGNETIC BEARING

[75] Inventor: Timothy A. Coombs, Cambridge, England

[73] Assignee: Rolls-Royce, plc, London, England

[21] Appl. No.: 537,675

[22] PCT Filed: Feb. 23, 1995

[86] PCT No.: PCT/GB95/00378

§ 371 Date: Jan. 11, 1996

§ 102(e) Date: Jan. 11, 1996

[87] PCT Pub. No.: WO95/23298

PCT Pub. Date: Aug. 31, 1995

[30] Foreign Application Priority Data

Feb. 24, 1994 [GB] United Kingdom ............ 9403580

[51] Int. Cl.$^6$ ............................................. H02K 7/00
[52] U.S. Cl. ...................... 310/90.5; 310/90; 505/876; 505/903; 505/905
[58] Field of Search ............................ 104/281, 283, 104/286; 505/903, 876, 905, 902; 335/219; 307/102; 310/90.5, 90

[56] References Cited

U.S. PATENT DOCUMENTS

| | | | |
|---|---|---|---|
| 3,407,749 | 10/1968 | Frig ........................... | 310/90.5 |
| 4,300,807 | 11/1981 | Poubeau ..................... | 308/10 |
| 5,010,563 | 4/1991 | Laurent et al. .............. | 378/132 |

FOREIGN PATENT DOCUMENTS

| | | |
|---|---|---|
| 0575619 | 12/1993 | European Pat. Off. . |
| 1549659 | 12/1968 | France . |

OTHER PUBLICATIONS

Rao et al., "Comparative Asessment of Single–Axis Force Generation Machanisms for Superconductiving Suspensions", Proceedings of the 25th Intersociety Energy Conversion Engineering Conference, vol. 6, 12 Feb. 1992, New York, USA, pp. 149–153, XP214875.

Marinescu et al., "Passive Axial Stabilization of a Magnetic Radial Bearing by Superconductors", IEEE Transactions on Magnetics, vol. 25, No. 5, Sep. 1989, New York, USA, pp. 3233–3235, XP69079.

*Primary Examiner*—Thomas M. Dougherty
*Assistant Examiner*—Karl I. E. Tamai
*Attorney, Agent, or Firm*—Cushman Darby & Cushman Intellectual Property Group of Pillsbury Madison & Sutro, LLP

[57] ABSTRACT

A magnetic thrust bearing (110) comprises a magnet (112) mounted on a shaft (114) and a plurality of equi-angularly spaced superconductors (116) mounted on a static structure (118). Each superconductor (116) is mounted onto the static structure (118) by a parallel hinge strip (120) which allows the superconductor (116) to move radially relative to the axis of rotation of the shaft (114). The radial movement of the superconductors (116) changes the cross-sectional area of the magnetic field between the magnet and the superconductors (116) and this changes the stiffness of the magnetic bearing (110). The superconductors (116) move radially due to the pivoting of the parallel hinge strips (120) due to changes in the loads acting on the magnetic bearing (110). It is possible to detect movement of the shaft and to actively move the superconductors to control the stiffness of the magnetic bearing and to control the clearance in the magnetic bearing as in FIG. 5.

16 Claims, 5 Drawing Sheets

UNDER NORMAL LOADING

UNDER INCREASED LOADING

MAGNETIC BEARING

FIELD OF THE INVENTION

This invention relates to a method, and apparatus for employing a method, of changing the stiffness of magnetic bearings. The invention relates in particular to magnetic bearings in which at least one of the constituent parts is formed by a superconductor.

BACKGROUND OF THE INVENTION

Magnetic bearings have several potential advantages over the more conventional, rolling element bearings. These advantages are obtained from the fact that in a magnetic bearing (unlike a rolling element bearing) there need be no contact between moving elements. Eliminating contact eliminates friction which in turn eliminates the need for lubrication. Friction also causes energy losses, wear and noise. Thus a magnetic bearing, potentially, is more efficient (in terms of energy loss), has a longer life-time, and is quieter than a rolling element bearing. These are the principal advantages to be gained from magnetic bearings.

Magnetic bearings however suffer from a major disadvantage when compared to rolling element bearings. That disadvantage is the stiffness of the bearing. Stiffness refers to the behaviour of the bearing when subjected to varying loads and specifically how much movement or "play" is induced in the bearing by a varying load. In a rolling element bearing where there is metal to metal contact the stiffness is very high as play is resisted by the metal itself. In a magnetic bearing however the resistive force is a function of the density of the magnetic field. When the load on a magnetic bearing is increased therefore the bearing will move until the magnetic field density has increased sufficiently. If the magnetic field is only changing slowly the bearing will have to move a large distance for this to happen and the bearing will have a low stiffness.

It is known to vary the magnetic field density by varying the current in the coils of an electromagnetic bearing, however this is not possible with magnetic bearings which use superconductors.

SUMMARY OF THE INVENTION

Accordingly the present invention seeks to provide a magnetic bearing in which the stiffness of the magnetic bearing is controllable.

Accordingly the present invention provides a magnetic bearing for supporting and allowing relative movement in a first directional sense between a first member and a second member, the magnetic bearing comprising first magnetic means mounted on the first member and second magnetic means mounted on the second member, the first and second magnetic means producing a magnetic field therebetween to oppose loads which cause the first and second members to move relative to each other with directional components perpendicular to the first directional sense, and means arranged to change the cross-sectional area of the magnetic field between the first and second magnetic means when the magnitude of the load changes so as to control the stiffness of the magnetic bearing.

Preferably the means arranged to change the cross-sectional area of the magnetic field comprises means to move the first and second magnetic means relative to each other to change the cross-sectional area of the magnetic field.

Preferably the relative movement of the first and second magnetic means has a directional component transverse to the direction of the load which causes the first and second members to move with directional components perpendicular to the first directional sense.

The second magnetic means may be mounted on the second member by at least one parallel strip hinge, each parallel strip hinge comprising at least two members arranged parallel to each other, a first end of each member is hinged to the second magnetic means and a second end of each member is hinged to the second member, whereby the parallel strip hinge rotates about its hinges on the second member to change the cross-sectional area of the magnetic field while maintaining the first and second magnetic means parallel. The at least one parallel strip hinge may be arranged at an angle to the direction of the load. The second magnetic means may comprise a plurality of magnetic components, each magnetic component is mounted on the second member by a respective one of a plurality of parallel strip hinges.

The second magnetic means may be mounted on the second member by a cam, the cam is eccentrically mounted on the second member, whereby the cam rotates about its mounting to change the cross-sectional area of the magnetic field. The second magnetic means may comprise a plurality of magnetic components, each magnetic component is mounted on the second member by a respective one of a plurality of cams.

The second magnetic means may be rotatably mounted on the second member, whereby the second magnetic means rotates about its mounting to change the cross-sectional area of the magnetic field. The second magnetic means may comprise a plurality of magnetic components, each magnetic component is rotatably mounted on the second member.

A servo may be slaved to one of the members, whereby relative movement between the first and second members causes relative movement of the first and second magnetic means.

The magnetic bearing may allow relative rotation between the first member and the second member. The magnetic bearing may be a thrust bearing.

The parallel strip hinges may be angularly spaced, each parallel strip hinge is arranged to move the second magnetic means radially with respect to the axis of rotation. The first member may rotate relative to the second member.

At least one of the magnetic means may comprise a superconducting magnet or a superconductor.

BRIEF DESCRIPTION OF THE DRAWINGS

The present invention will be more fully described by way of examples with reference to the accompanying drawings, in which.

DETAILED DESCRIPTION OF THE INVENTION

Figure 1:
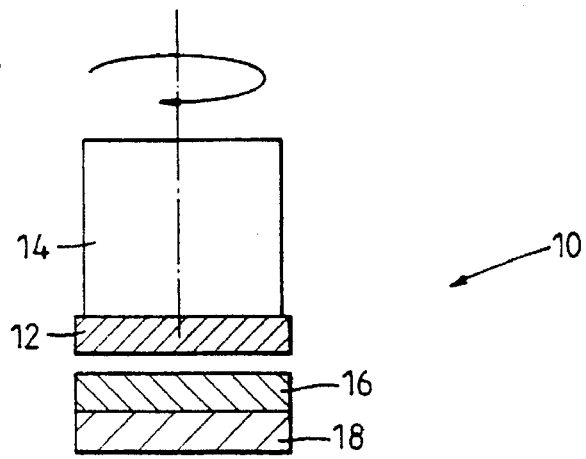
FIG. 1 is a schematic view of a prior art magnetic bearing.

A prior art magnetic thrust bearing 10 is shown in FIG. 1 and this comprises a permanent magnet 12 mounted on a shaft, or rotor, 14 and a superconductor 16 mounted on static structure 18. When the axial load on the magnetic thrust bearing 10 is increased the bearing 10 moves until the magnetic field density has increased sufficiently to prevent further movement. If the magnetic field is only changing slowly the bearing will have to move a large distance for this to happen and the bearing will have a low stiffness.

The present invention relates to a method whereby the stiffness of a magnetic bearing may be changed by reducing the dependence on the density of the magnetic field and (under certain conditions) reducing that dependence to zero. The stiffness of the bearing may therefore be changed (either increased or reduced) independently of the magnetic field. This is possible because the load bearing capacity of a magnetic field is a function of the density of the magnetic field and also of the cross-sectional area of the magnetic field. This invention is therefore a method of changing the area of the magnetic field between the two elements of the bearing. If the area of the magnetic field were doubled (or more) in response to a doubling of the load on the bearing then the stiffness of the bearing could become totally independent of the density of the magnetic field. Increasing the stiffness of a magnetic bearing would widen the scope for the application of magnetic bearings considerably.

Accordingly, the present invention provides a method of changing the stiffness of a magnetic bearing and that method is to change the cross-sectional area of the magnetic field.

Figure 2A:
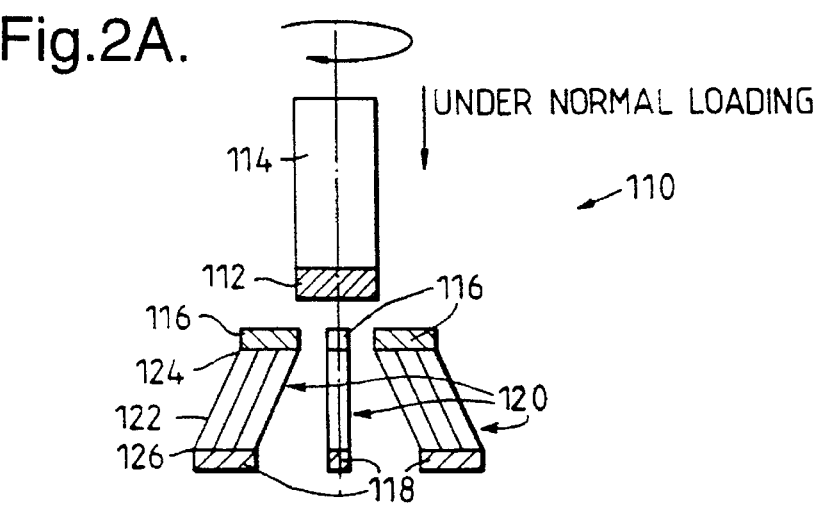
FIGS. 2A and 2B are schematic views of a magnetic bearing according to the present invention.
Figure 2B:
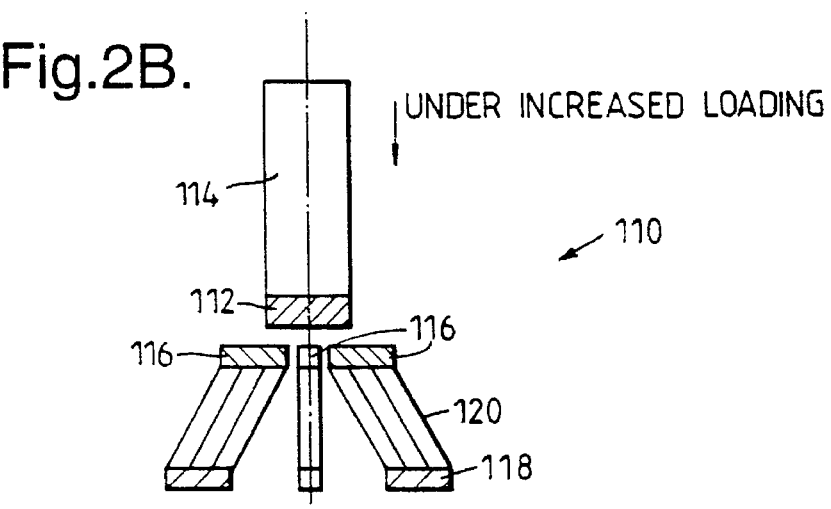

A part of a magnetic thrust bearing 110 according to the present invention is shown in FIGS. 2A and 2B. The magnetic thrust bearing 110 comprises a permanent magnet 112 mounted on a shaft, or rotor, 114 and a plurality of equi-angularly spaced superconductors 116 mounted on a static structure 118. In this example there are four superconductors 116 spaced apart by 90 degree angles. Each of the superconductors 116 is mounted on the static structure 118 by a respective one of a plurality of parallel strip hinges 120. The load on the magnetic thrust bearing 110 is supported by the magnetic field between the two magnetic components i.e. the permanent magnet 112 and the superconductors 116. When the load on the magnetic thrust bearing 110 is increased, the load on the structure 120 supporting the superconductors 116 also increases. This causes the support structure 120 to move laterally and with it the superconductors 116. This increases the area of overlap between the permanent magnet 112 and the superconductors 116 and therefore increases the cross-sectional area of the magnetic field. The greater the change in magnetic field the less the requirement for the two magnetic components, permanent magnet 112 and superconductors 116, to move together. If, for example, the cross-sectional area doubles in response to a doubling of the load then the two magnetic components, permanent magnet 112 and superconductors 116, need not move together at all and the stiffness of the magnetic thrust bearing 110 becomes the stiffness of the support and independent of the magnetic field.

This method has the advantage in that it is entirely passive and requires no control circuitry to implement. In FIGS. 2A and 2B each parallel strip hinge 120 comprises two, or more, parallel members 122. Each of the members 122 is hinged at a first end 124 to one of the superconductors 116 and is hinged at a second end 126 to the static structure 118. Each parallel strip hinge 120 is initially set at an angle to the axis of rotation of the magnetic thrust bearing 110 as shown in FIG. 2A. When the load on the magnetic thrust bearing 110, and hence on the parallel strip hinges 120, changes the parallel strip hinges 120 pivot and change the angle defined between the parallel strip hinges 120 and the axis of rotation of the magnetic thrust bearing 110 as shown in FIG. 2B. This pivoting of the parallel strip hinges 120 moves the superconductors 116 radially relative to the axis of rotation of the magnetic thrust bearing 110 and has the desired effect of changing the cross-sectional area of the magnetic field. This method of implementing the invention has two principle advantages. The first is that, although the angle of the parallel strip hinges 120 changes, because the parallel strip hinges 120 are composed of two parallel members 122, the superconductors 116 do not rotate and the faces of the superconductors 116 and the permanent magnet 112 remain parallel. The second advantage is that there is no friction associated with parallel strip hinges 120. It is preferred that there is an even number of superconductors 116 and that each superconductor 116 is diametrically opposed by another superconductor 116 so that the superconductors 116 are effectively in pairs and move in opposition to each other.

Figure 3:
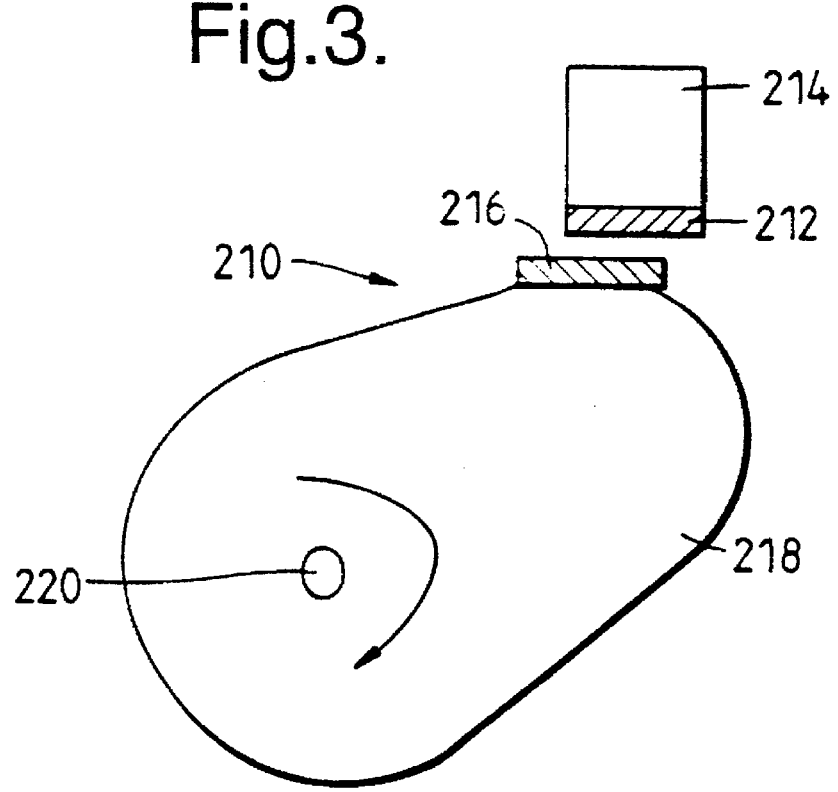
FIG. 3 is a schematic view of a further magnetic bearing according to the present invention.
Figure 9:
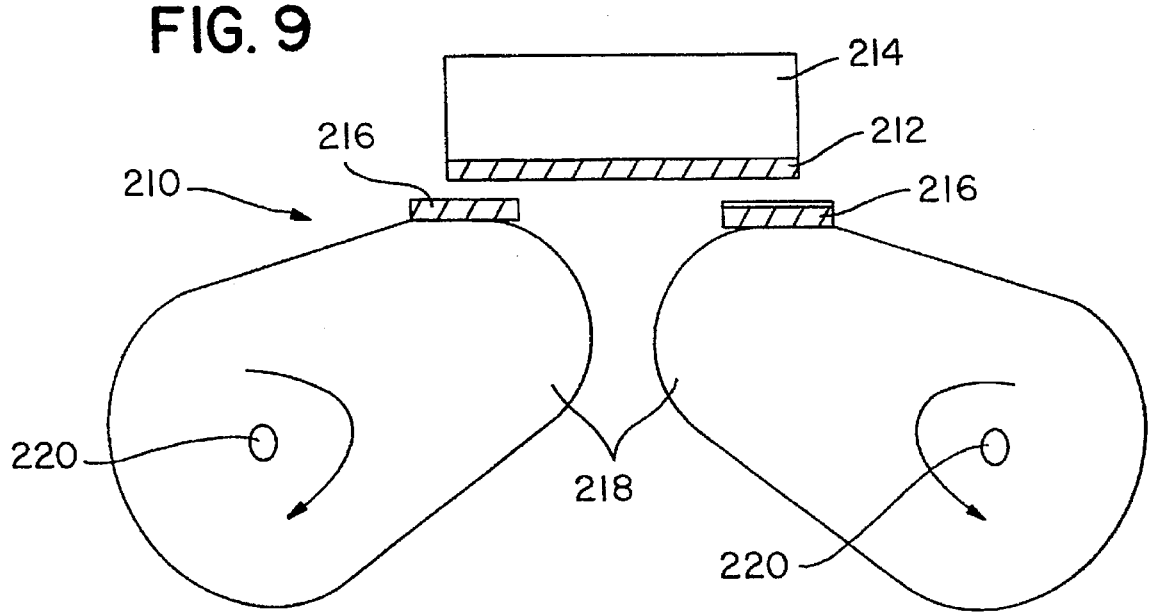
FIG. 9 is a view similar to FIG. 3 but showing a plurality of cams for the intermagnetic bearing.

Another magnetic thrust bearing according to the present invention is shown in FIG. 3. The magnetic thrust bearing 210 comprises a permanent magnet 212 mounted on a shaft, or rotor, 214 and a superconductor 216 mounted on a shaped cam 218. The cam 218 is eccentrically rotatably mounted on static structure by a pivot 220. The shaped cam 218 rotates in response to changing load on the magnetic thrust bearing 210, however this would introduce friction into the system. This method has the advantage in that it is entirely passive and requires no control circuitry to implement. If, however, problems are encountered with, for example, buckling of the parallel strip hinges, then this may prove a more appropriate method of implementing the invention in a production bearing. Obviously a number of cams as shown in FIG. 9, may be provided to support a number of equi-angularly spaced superconductors. There are in fact a number of ways of implementing the invention but the parallel strip hinge method is the simplest.

Figure 4:
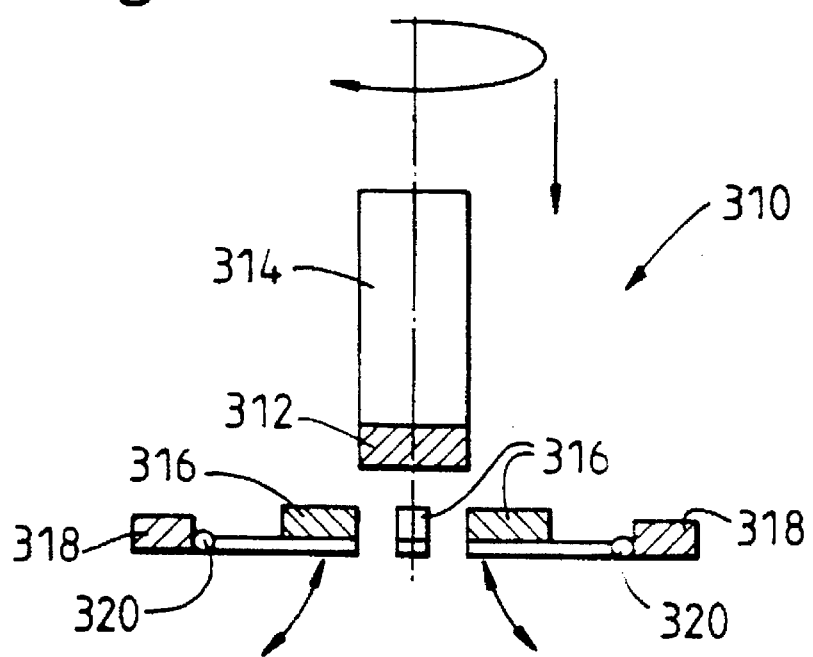
FIG. 4 is a schematic view of another magnetic bearing according to the present invention.

A further magnetic thrust bearing according to the present invention is shown in FIG. 4. The magnetic thrust bearing 310 comprises a permanent magnet 312 mounted on a shaft, or rotor, 314 and a plurality of superconductors 316 mounted on static structure 318. The superconductors 316 are rotatably mounted on the static structure 318 by pivots 320. The superconductors 316 are equi-angularly spaced and thus move in radial planes relative to the axis of rotation of the magnetic thrust bearing 310. The pivots 320 causes at least one of the magnetic components, i.e. the superconductors 316, to rotate with respect to the other component, i.e. the permanent magnet 312, preferably in a direction so that the respective component, the superconductor 316, makes an angle to the magnetic field, thereby changing the cross-sectional area of the magnetic field, and consequently the stiffness of the magnetic thrust bearing 310. This method has the advantage in that it is entirely passive and requires no control circuitry to implement.

Figure 8:
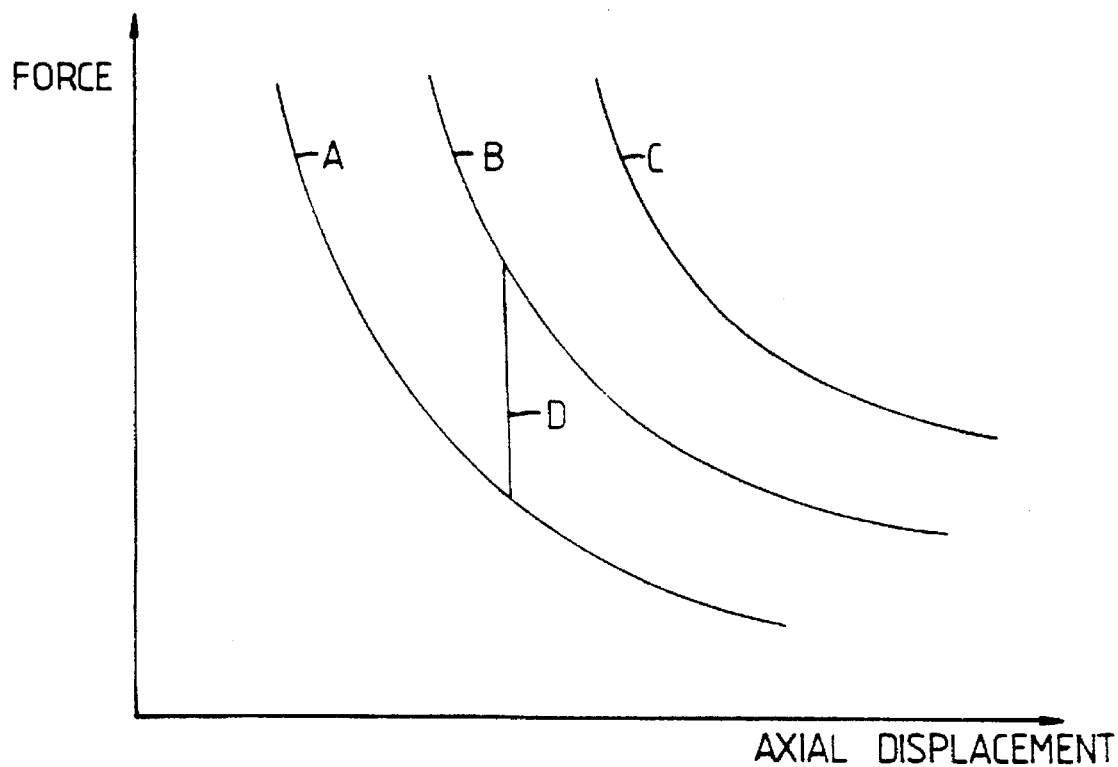
FIG. 8 is a graph of force against axial displacement for different cross-sectional areas of magnetic field.

In the case of the passive magnetic thrust bearings according to the present invention the stiffness of the bearing is the slope of the force against axial displacement curve with the appropriate cross-sectional area of magnetic field, as shown by the three curves A, B and C for different cross-sectional areas of magnetic field in FIG. 8.

Further to the previous paragraphs it may be desirable to incorporate active elements in the system. That is instead of relying on a parallel strip hinge, a cam or a lever, the lateral motion of one of the magnetic components is achieved by means of a servo the motion of which is slaved to the load on the magnetic thrust bearing.

Figure 5:
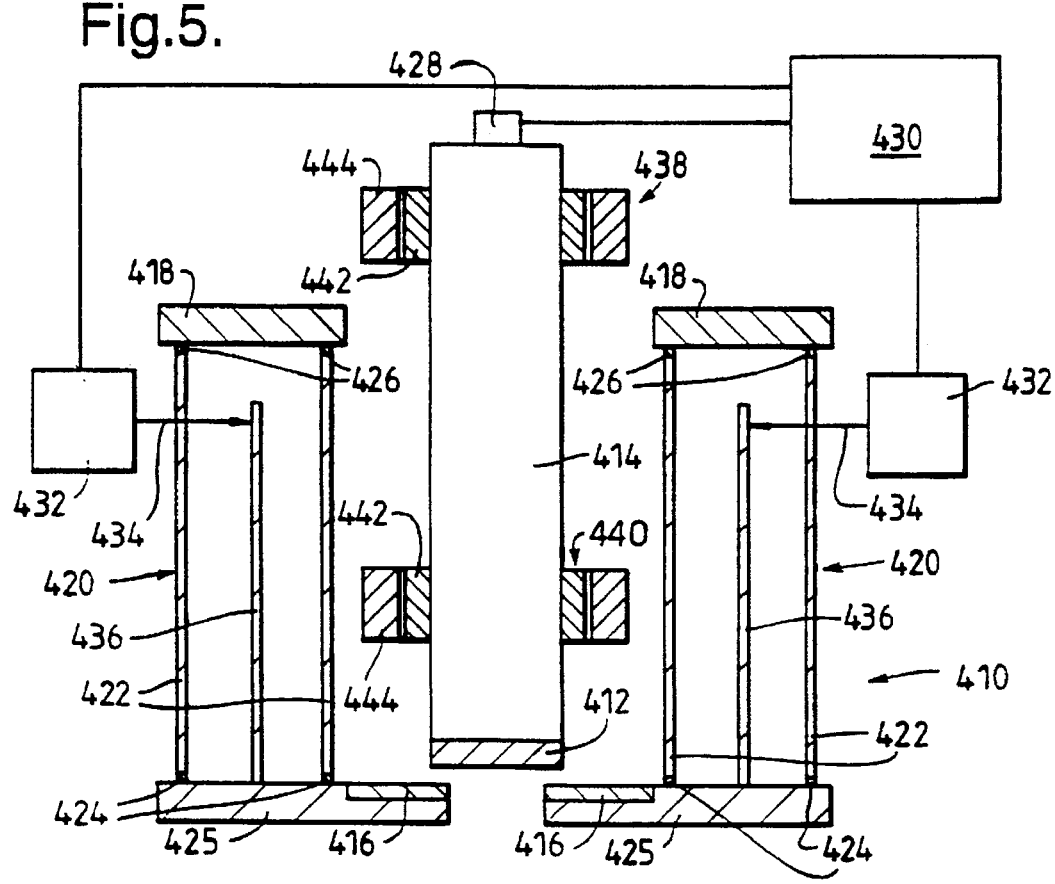
FIG. 5 is a cross-sectional view of another magnetic bearing according to the present invention.

An active magnetic thrust bearing according to the present invention is shown in FIG. 5. The magnetic thrust bearing 410 comprises a permanent magnet 412 mounted on a shaft, or rotor, 414 and a plurality of equi-angularly spaced superconductors 416 mounted on static structure 418. In this example there are four superconductors 416 spaced apart by 90 degree angles. Each of the superconductors 416 is mounted on the static structure 418 by a respective one of a plurality of parallel strip hinges 420. The load on the magnetic thrust bearing 410 is supported by the magnetic field between the two magnetic components i.e. the permanent magnet 412 and the superconductors 416. The shaft, or rotor, 414 is also mounted on the static structure 418 by magnetic journal bearings 438 and 440. Each magnetic journal bearing 438,440 comprises a permanent magnet 442 on the shaft, or rotor, 414 and an annular permanent magnet 444 on the static structure 418. Each parallel strip hinge 420 comprises two, or more, parallel members 422. Each of the members 422 is hinged at a first end 424 to one of a plurality of members 425. Each member 425 carries one of the superconductors 416. Each member 422 is hinged at a second end 426 to the static structure 418. Each parallel strip hinge 420 is initially set parallel to, or at a suitable angle relative to the axis of rotation of the magnetic thrust bearing 410 as shown in FIG. 5. It is preferred that there is an even number of superconductors 416 and that each superconductor 416 is diametrically opposed by another superconductor 416 so that the superconductors 416 are effectively in pairs and move in opposition to each other.

A displacement sensor 428 is located near to the shaft, or rotor, 414 to detect changes in the axial position of the shaft 414. The displacement sensor 428 is either a capacitive, an inductive or other suitable sensor. The displacement sensor 428 supplies electrical signals, representing the axial position of the shaft 414, to a processor 430. The processor 430 analyses the electrical signals supplied from the displacement sensor 428 and sends control signals to a plurality of actuators 432. Each actuator 432 is arranged to control the position of one of the superconductors 416 by moving the respective superconductor 416 radially. Each actuator 432 applies a varying load on the member 425 carrying the respective superconductor 416 by applying a load 434 to a lever 436 connected to the member 425.

In the case of the active magnetic thrust bearings according to the present invention the stiffness of the bearing is no longer the slope of the force against axial displacement curve with the appropriate cross-sectional area of magnetic field, as shown by curves A, B and C in FIG. 8 rather the active control allows movement between force against axial displacement curves, for example between curves A and B along curve D as shown in FIG. 8, for different cross-sectional areas of magnetic field. This means that the stiffness of the bearing may be set to any required value, and the position of the bearing, and hence the position of the shaft can be controlled absolutely. The clearance between the permanent magnet and the superconductors may thus be constant. Also the bearing clearance can be controlled, if the cross-sectional area of the magnetic field is increased when there is no increase in load, the bearing clearance will increase. This allows smaller clearance gaps in turbines and hence improves efficiency of turbines. A further advantage of active magnetic bearings according to the invention is that they are self levelling.

Figure 6:
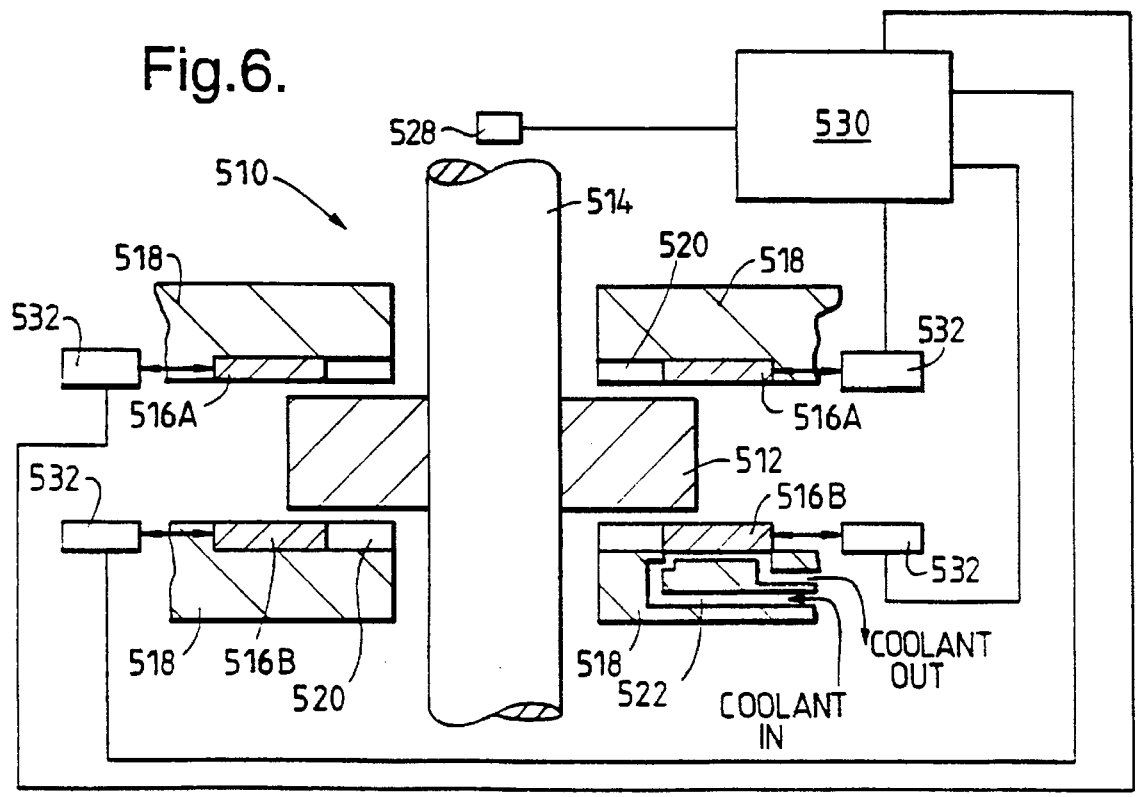
FIG. 6 is a cross-Sectional view of a double thrust bearing according to the present invention.

An active magnetic double thrust bearing according to the present invention is shown in FIG. 6. The magnetic double thrust bearing 510 comprises a permanent magnet 512 mounted on a shaft, or rotor, 514 and a plurality of equi-angularly spaced superconductors 516A and a plurality of equi-angularly spaced superconductors 516B mounted on static structure 518. In this example there are four superconductors 516A spaced apart by 90 degree angles. In this example there are four superconductors 516B spaced apart by 90 degree angles. The superconductors 516A and 516B are spaced apart by the permanent magnet 512. Each of the superconductors 516A, 516B is mounted on a respective radial track 520 on the static structure 518. The axial load in one direction on the magnetic thrust bearing 510 is supported by the magnetic field between the two magnetic components i.e. the permanent magnet 512 and the superconductors 516A and the axial load in the opposite direction is supported by the magnetic field between the permanent magnet 512 and the superconductors 516B.

A displacement sensor 528 is located near to the shaft, or rotor, 514 to detect changes in the axial position of the shaft 514. The displacement sensor 528 is either a capacitive, an inductive or other suitable sensor. The displacement sensor 528 supplies electrical signals, representing the axial position of the shaft 514, to a processor 530. The processor 530 analyses the electrical signals supplied from the displacement sensor 528 and sends control signals to a plurality of actuators 532. Each actuator 532 is arranged to control the position of one of the superconductors 516 by moving the respective superconductor 516 radially. The actuators 532 may be linear motors. The static structure 518 is provided with passages 522 to supply and remove coolant from the superconductors 516.

Figure 7:
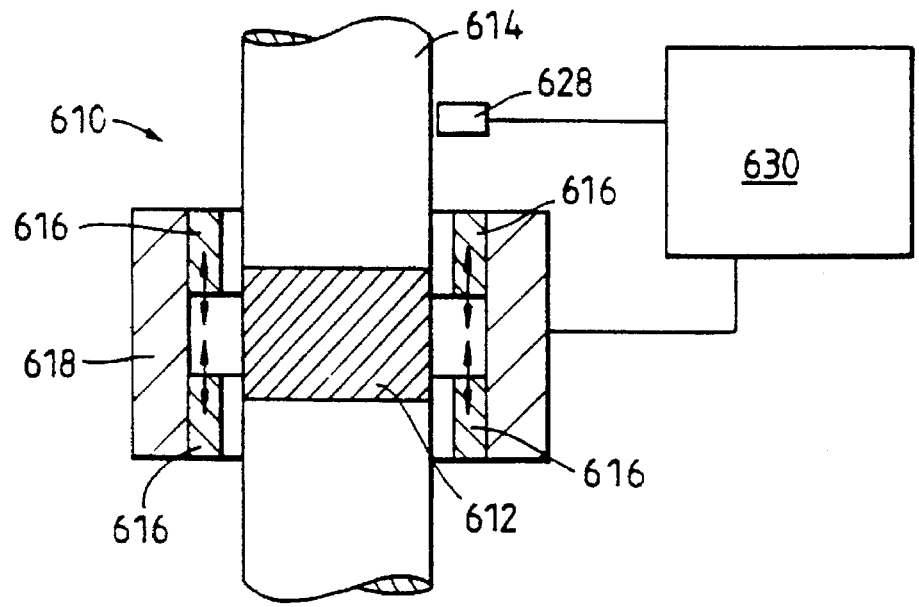
FIG. 7 is a cross-sectional view of a journal bearing according to the present invention.

An active magnetic journal bearing according to the present invention is shown in FIG. 7. The magnetic journal bearing 610 comprises a permanent magnet 612 mounted on a shaft, or rotor, 614 and a plurality of equi-angularly spaced superconductors 616A and a plurality of equi-angularly spaced superconductors 616B mounted on static structure 618. In this example there are four superconductors 616A spaced apart by 90 degree angles. In this example there are four superconductors 616B spaced apart by 90 degree angles. Each of the superconductors 616A, 616B is mounted on a respective axial track on the static structure 618. The radial loads the journal bearing 610 are supported by the magnetic field between the two magnetic components i.e. the permanent magnet 612 and the superconductors 616A and the superconductors 616B.

A displacement sensor 628 is located near to the shaft, or rotor, 614 to detect changes in the axial position of the shaft 614. The displacement sensor 628 is either a capacitive, an inductive or other suitable sensor. The displacement sensor 628 supplies electrical signals, representing the axial position of the shaft 614, to a processor 630. The processor 630 analyses the electrical signals supplied from the displacement sensor 628 and sends control signals to a plurality of actuators 632. Each actuator 632 is arranged to control the position of one of the superconductors 616 by moving the respective superconductor 616 axially. The actuators 632 may be linear motors. The static structure 618 is provided with passages to supply and remove coolant from the superconductors 616. It may be possible to use two annular superconductors 616, which move axially rather than a plurality of superconductors 616A,616B.

This document has used, by way of example, a thrust bearing to illustrate both the invention and a method implementing it. The invention is not however restricted to a thrust bearing and could be applied to other forms of bearing such as a journal bearing in which the bearing provides resistance against lateral motion and to linear bearings.

The invention has been described with reference to magnetic bearings which work by repulsion between the magnetic components, but the invention is also applicable to magnetic bearings which work by attraction between the magnetic components. The invention has been described with reference to the magnetic component combination of a magnet and superconductors but is equally applicable for the magnetic component combinations of superconductors and superconductors or magnets and magnets. In the case of the combination of the magnet and superconductors the magnet induces an image magnet in the superconductors due to the fact that superconductors are diamagnetic. The superconductors may be permanent magnets.

It is preferred that the superconductors are positioned in a constant magnetic field, this is so that it is not necessary to expend work to change the magnetic flux in the superconductors. Accordingly it is preferred that the magnets for rotational bearings are rotationally symmetrical, i.e. the magnet is circular or annular in cross-section.

It is also possible to locate the superconductor(s) on the shaft, or rotor, and locate the magnet(s) on the static structure. In this case it may be possible to have an annular magnet on the static structure and move the superconductors either radially, or axially, for thrust and journal bearings respectively. It may be possible to have an annular, or circular, superconductor on the rotor and a plurality of magnets which move radially, or axially, for thrust and journal bearings respectively.

I claim:

1. A magnetic bearing for supporting and allowing relative movement in a first directional sense between a first member and a second member, the magnetic bearing comprising first magnetic means mounted on the first member and second magnetic means mounted on the second member, the first and second magnetic means producing a magnetic field therebetween having a cross-sectional area to oppose loads which cause the first and second members to move relative to each other with directional components perpendicular to the first directional sense, and means arranged to change the cross-sectional area of the magnetic field between the first and second magnetic means when the magnitude of the load changes so as to control the stiffness of the magnetic bearing said relative movement of the first and second magnetic means having a directional component transverse to the direction of the load which causes the first and second members to move with directional components perpendicular to the first directional sense.

2. A magnetic bearing as claimed in claim 1 wherein the second magnetic means (116) is mounted on the second member (118) by at least one parallel strip hinge (120), each parallel strip hinge (120) comprising at least two members (122) arranged parallel to each other, a first end of each member (122) is hinged (124) to the second magnetic means (116) and a second end of each member (122) is hinged (126) to the second member (118), whereby the parallel strip hinge (120) rotates about its hinges (126) on the second member (118) to change the cross-sectional area of the magnetic field while maintaining the first and second magnetic means (112,116) parallel.

3. A magnetic bearing as claimed in claim 2 wherein the at least one parallel strip hinge (120) is arranged at an angle to the direction of the load.

4. A magnetic bearing as claimed in claim 2 or claim 3 wherein the second magnetic means (116) comprises a plurality of magnetic components (116), each magnetic component (116) is mounted on the second member (118) by a respective one of a plurality of parallel strip hinges (120).

5. A magnetic bearing as claimed in claim 1 wherein the second magnetic means (216) is mounted on the second member by a cam (218), the cam (218) is eccentrically mounted on the second member, whereby the cam (218) rotates about its mounting (220) to change the cross-sectional area of the magnetic field.

6. A magnetic bearing as claimed in claim 5 wherein the second magnetic means (216) comprises a plurality of magnetic components (216), each magnetic component (216) is mounted on the second member by a respective one of a plurality of cams (218).

7. A magnetic bearing as claimed in claim 1 wherein the second magnetic means (316) is rotatably mounted on the second member (318), whereby the second magnetic means (316) rotates about its mounting (320) to change the cross-sectional area of the magnetic field.

8. A magnetic bearing as claimed in claim 7 wherein the second magnetic means (316) comprises a plurality of magnetic components (316), each magnetic component (316) is rotatably mounted (320) on the second member (318).

9. A magnetic bearing as claimed in claim 8 wherein a servo (428,430,432,434,436) is slaved to one of the members (414), whereby relative movement between the first and second members (414,418) causes relative movement of the first and second magnetic means (412,416).

10. A magnetic bearing as claimed in claim 9 wherein the magnetic bearing (110) allows relative rotation between the first member (114) and the second member (118).

11. A magnetic bearing as claimed in claim 10 wherein the magnetic bearing (110) is a thrust bearing.

12. A magnetic bearing as claimed in claim 4 wherein the parallel strip hinges (120) are angularly spaced, each parallel strip hinge (120) is arranged to move the second magnetic means (116) radially with respect to an axis of rotation.

13. A magnetic bearing as claimed in claim 12 wherein the first member (114) rotates relative to the second member (118).

14. A magnetic bearing as claimed in claim 13 wherein at least one of the magnetic means (116) comprises a superconducting magnet or a superconductor.

15. A magnetic bearing as claimed in claim 14 wherein the other magnetic means (112) comprises a magnet, the magnet (112) is rotationally symmetrical.

16. A magnetic bearing as claimed in claim 15 wherein the confronting faces of the first magnetic means (112) and the second magnetic means (116) have the same polarity.

* * * * *